Patented Dec. 14, 1948

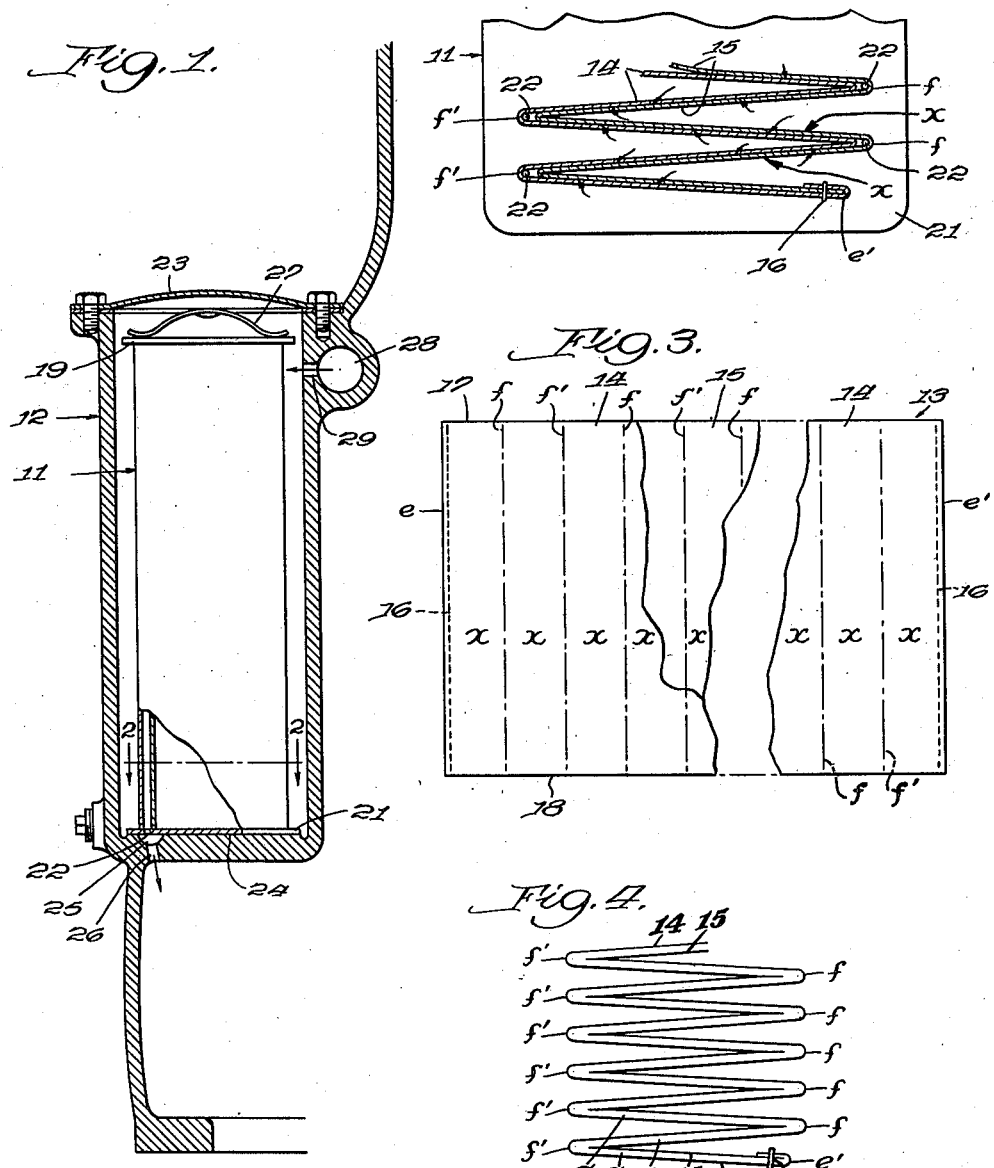

2,456,292

UNITED STATES PATENT OFFICE 2,456,292

LIQUID FILTERING APPARATUS

Howard S. Manwaring, La Grange, Ill., assignor to International Harvester Company, a corporation of New Jersey Application July 30, 1945, Serial No. 607,692

5 Claims. (Cl. 210—169)

This invention has to do with filters of the type employing an envelope with opposed thin filtering walls collapsible together by the pressure of liquid in which the envelope is immersed for filtering pursuant to the passage of such liquid into the thin zone between such walls. The invention more particularly concerns the shape of said envelope and the means for draining the filtered liquid therefrom.

A primary object of this invention is the provision of a filter unit constructed and arranged according to principles enabling its filtering medium to possess an unusually large filtering area in relation to the volumetric space occupied by such unit, and further to possess dimensional proportions minimizing the distance that the unit need project from a mounting therefor. These space and dimensional factors are especially significant for filters mounted as accessory equipment upon internal combustion engines to filter fuel or lubricating oil therefor. The present invention improves the space factor by eliminating a supporting core for the filtering envelope and by convoluting and so shaping the envelope that no non-utilized space is embraced thereby.

Another object is the provision of an unique drainage system and structure communicative with the interior of the convoluted envelope at a plurality of points which are distributed to facilitate the filtering process.

A more comprehensive understanding of these and other desirable objects inherent in and encompassed by the invention can be gained from the ensuing description and the annexed drawings, wherein:

Figure 1 is a vertical sectional view taken through a chamber containing a filter unit embodying a form of the invention, said unit having a portion thereof cut away for illustrating the duct means associated therewith for the drainage of filtered liquid entering the unit from the interior of the chamber;

Figure 2 is a fragmentary horizontal sectional view taken upon the line 2—2 of Figure 1;

Figure 3 is a plan view of a filtering envelope prior to it being folded for assembly into the present filtering unit; and Figure 4 is a fragmentary end view of the envelope shown in Figure 3, subsequent to the folding of convolutions in said envelope.

The filtering unit 11 which is removably contained within a casing 12 has its filtering portion formed and shaped from a hollow wall structure 13 which, as illustrated in Figure 3, is initially in a flat condition. In the present form the structure 13 is constructed of two sheets of filter paper 14 and 15. These sheets 14 and 15 are long and are stitched together at their ends e and e', as indicated at 16. If desired, the sheets 14 and 15 may be formed integrally and folded over (for example at a crease located at a position corresponding to the position of the upper edges 17 of the illustrated separate sheets) onto one another to obtain essentially the arrangement illustrated in Figure 3. In the present embodiment the long opposite edges 17 and 18 of the sheets 14 and 15 are unattached.

With the hollow wall structure 13 in the condition illustrated in Figure 3, a series of reverse folds are formed therein in respective registry with laterally spaced substantially parallel line-like sections extending between the opposite edges 17 and 18, as illustrated by the dot-dash lines $f$ and $f'$. The line-like places of fold $f$ are arranged alternately with the places of fold designated $f'$, and these parallel lineal folds at $f$ and $f'$ are alternately turned oppositely so that, subsequent to folding, said structure will possess a series of convolutions, as illustrated in Figure 4, which is a view looking at the upper edges 17. By so folding the envelope or hollow wall structure there is formed a series of hollow sections X of which each diverges slightly from others at fold lines $f$ or $f'$.

While the hollow wall structure 13 is retained in the folded or convoluted condition, illustrated in Figure 4, rectangular end plates 19 and 21 are attached in sealing relation with the edges 17 and 18 of the filter sheets to seal the upper and lower ends of the hollow sections X. When the perimeters of the sheets 14 and 15 are thus joined they form a hollow envelope with opposed contiguous filtering side walls. The sealing connection between the end plates and the edges of the envelope may be established by first coating the face of said end plates which are to be joined to the edges of said envelope with a suitable adhesive. This coating may be a thermosetting material, such as a Bakelite compound, or it may be a thermo-plastic material, either of which becomes fluid and tacky when initially heated. A series of holes 22 is formed in at least one of the plates, and in the present embodiment these holes are formed in the sealing plate 21 for providing direct communication with the various hollow sections X. Communicative registration of the hollow sections X with the holes 22 is established by a jig (not shown) having a plurality of pins which are projected upwardly through the holes and about which the fold line sections $f$ and f' are respectively placed until the lower edge of the sections are adhesively attached to the plate 21.

The casing 12 with which the replaceable unit 11 cooperates is shown as an integral portion of an engine crank-case side wall. When a cover plate 23 is removed from the upper open end of the chamber 12, the unit 11 may be inserted or withdrawn through such opening. A flat bottom 24 of the chamber contains drainage duct means having an inlet in the form of an open channel 25 which, together with the bottom plate 21 of the unit, forms a closed duct extending transversely of the envelope hollow sections X and communicating with these sections through the bottom plate openings or ports 22. Filtered oil escaping through the ports 22 into the duct means, comprising channel 25, can return to the bottom of the crank-case through a chamber bottom opening 26 of such drainage duct means for recirculation by a pump, not shown, through the pressure phase of the lubrication system. A leafspring 27 attached to the underside of the chamber cover member 23 holds the bottom plate 21 in firm sealed relation with the flat bottom 24 of the chamber.

When the apparatus is in operation, unfiltered oil is introduced into the chamber 12 under pressure through a duct 28 and a port 29. This oil completely fills the chamber. The oil or fluid in the chamber enters the porous side walls of the envelope through each of the sheets 14 and 15, as illustrated by the arrows in Figure 2, and after entering the envelope, flows between said sheets to the nearest outlet port 22 and thence into the duct means 25 for return in a filtered condition to the sump or crank-case.

The sheets 14 and 15 are preferably formed of filter paper treated as by means of a suitable resin to stiffen and moisture proof its fibers without the resin being present in sufficient quantity to clog the pores. Because of the sheets 14 and 15 being relatively thin and frail, the pressure of the oil body into which the unit is immersed in the chamber 12 will tend to displace the envelope side walls, but this displacement does not impair the operation of the filter, nor rupture the side walls of the envelope, since these walls are displaced in a manner reacting each against the other.

By forming the reverse fold convolutions in the envelope, such envelope is caused to occupy a relatively small volume of space without sacrificing any of its extensive filtering area. Particularly there is no unutilized space in the completed filtering unit because of the filtering medium having to be supported upon a core or otherwise having to embrace unutilized space. Moreover the unit is in the shape of a flattened parallelepiped which adapts the unit to be placed in a casing arrangeable so as to minimize the distance that it must project from the side of an engine, for example.

Having thus described a single preferred embodiment of the invention with the view of clearly illustrating the same, I claim:

1. In a filter for fluids, a thin hollow wall structure having opposed contiguous walls of thin filtering sheets through which the fluid is filterable into said structure from a fluid body ambient thereto, said structure comprising a series of hollow sections of which adjacent thereof are connected together in diverging relation by respective folds of a series of successively oppositely turned folds in such structure and arranged alternately with such hollow sections, the opposite sides of said hollow sections being pressable inwardly in a manner reacting each against the other by the pressure of such fluid body, a sealing plate for the hollow wall structure at an edge thereof to which ends of the hollow sections and of said folds extend, and drainage means comprising a plurality of ports in said sealing plate directly communicative with various of said hollow sections.

2. In filtering apparatus for liquids, a thin hollow wall structure having opposed contiguous sheet-like filtering walls through which liquid is filterable into the structure from a liquid body while said structure is immersed therein, said structure comprising a series of hollow sections the adjacent of which are joined at and diverge from respective laterally spaced substantially parallel lineal folds alternately turned oppositely and extending between opposite edges of the structure, a sealing plate assembled with one of said edges of the hollow wall structure, and duct means comprising a row of ports in said plate, said row of ports extending transversely of said hollow sections, and said ports being in communicative registry with respective of said hollow sections.

3. In filtering apparatus for liquids, a filtering unit including a thin hollow wall structure having opposed contiguous sheet-like filtering walls through which liquid is filterable into the structure from a liquid body while said structure is immersed therein, said structure comprising a series of hollow sections the adjacent of which are joined at and diverge from respective laterally spaced substantially parallel lineal folds alternately turned oppositely and extending between opposite edges of the structure, a sealing plate assembled with one of said edges of the hollow wall structure and having a flat exterior surface, outlet ports directly communicative through the plate and said flat surface thereof with various of said hollow sections, a casing in which said unit is replaceably disposable, said casing having a flat interior surface and drainage duct means which has an inlet facing interiorly of the casing through such interior surface, and said surfaces fitting flatly together for establishing a sealed intercommunicative relation between said ports and said inlet of the drainage duct means when the unit is disposed in the casing.

4. In a liquid filtering unit removably insertable into a liquid-body-containing chamber having drainage duct means for said unit: said unit comprising a thin hollow wall structure immersible in said liquid body pursuant to insertion of said unit into said chamber, said hollow wall structure comprising opposed contiguous sheet-like filtering walls through which liquid is filterable from said body during such immersion, said structure also comprising a series of hollow sections the adjacent of which have junctions at and diverge from respective laterally-spaced substantially parallel fold lines extending between opposite edges of said structure, the opposite sides of said hollow sections being respectively formed by opposed portions of said contiguous filtering walls, a sealing plate attached to one of said edges of the hollow structure, said plate having a plurality of outlet ports therethrough communicative with the interior of said hollow wall structure and in registry with respective junctions of the diverging hollow wall sections, and means establishing a sealed communicative relation between said ports and said duct means when the unit is inserted in said chamber.

5. In a liquid filtering unit, a thin hollow wall structure having opposed contiguous sheet-like filtering walls through which liquid is filterable into the structure from a liquid body while said structure is immersed therein, said structure comprising a series of adjacent hollow sections each extending between opposite edges of said structure, and arranged in zigzag fashion wherefore there are junctions between the sections from which adjacent sections diverge; a sealing plate attached to one of said structure edges to serve as closing means for such edge, and drainage means for said structure comprising holes extending through said plate in communication with said hollow wall structure at points in registry with respective of said junctions.

HOWARD S. MANWARING.

REFERENCES CITED

The following references are of record in the file of this patent:

UNITED STATES PATENTS

| Number | Name | Date |
|---|---|---|
| 1,965,172 | Cammen | July 3, 1934 |
| 2,210,397 | Dreiss | Aug. 6, 1940 |
| 2,239,868 | Williams | Apr. 29, 1941 |
| 2,279,423 | Vokes | Apr. 14, 1942 |
| 2,352,300 | Walker et al. | June 27, 1944 |
| 2,372,865 | Taylor | Apr. 3, 1945 |
| 2,427,862 | Judkins | Sept. 23, 1947 |

FOREIGN PATENTS

| Number | Country | Date |
|---|---|---|
| 401,287 | Great Britain | Oct. 30, 1933 |